United States Patent [19]

Nakanishi et al.

[11] Patent Number: 5,014,142
[45] Date of Patent: May 7, 1991

[54] MAGNETIC DISK APPARATUS WITH HEAD SUPPORTING STRUCTURES OF DIFFERENT PROPER OSCILLATIONS

[75] Inventors: Eiji Nakanishi, Kanagawa; Toshio Suzuki, Chigasaki; Masato Furusaki, Odawara; Kiyoji Morita, Odawara; Hiroshi Sakurai, Odawara; Hiroshi Daito, Kanagawa; Mikio Takahashi, Odawara, all of Japan

[73] Assignee: Hitachi, Ltd., Tokyo, Japan

[21] Appl. No.: 327,130

[22] Filed: Mar. 22, 1989

[30] Foreign Application Priority Data

Mar. 24, 1988 [JP] Japan .................................. 63-71667

[51] Int. Cl.[5] .............................................. G11B 5/596
[52] U.S. Cl. ............................ 360/98.01; 360/77.05; 360/106
[58] Field of Search ...................... 360/105, 106, 97.01, 360/97.02, 98.01, 98.02, 137, 77.06, 77.11, 77.05

[56] References Cited

U.S. PATENT DOCUMENTS

| 4,068,267 | 1/1978 | Inouye | 360/77.05 |
| 4,516,177 | 5/1985 | Moon et al. | 360/77.02 |
| 4,714,972 | 12/1987 | Biermeier et al. | |
| 4,860,135 | 8/1989 | Cain | 360/97.02 |

Primary Examiner—David J. Severin
Attorney, Agent, or Firm—Fay, Sharpe, Beall, Fagan, Minnich & McKee

[57] ABSTRACT

A magnetic disk apparatus has a disk assembly including a single servo disk and a plurality of data disks, a servo-head supporting structure for supporting a servo head and data-head supporting structures for supporting data heads. These heads are so disposed as to cooperate with respective disks. The servo-head and data-head supporting structures are driven by an actuator to move the servo head and the data heads to the required positions on the corresponding disks. The servo-head supporting structure and each of the data-head supporting structures have different proper oscillations to prevent the occurrence of a resonance during a seek operation.

13 Claims, 7 Drawing Sheets

MAGNETIC DISK APPARATUS WITH HEAD SUPPORTING STRUCTURES OF DIFFERENT PROPER OSCILLATIONS

BACKGROUND OF THE INVENTION

1. Field of the Invention

The present invention relates generally to a magnetic disk apparatus and, more particularly, to a magnetic disk apparatus of the servo control type which employs as a servo head one of a plurality of heads which cooperate with a disk assembly having a plurality of magnetic disks.

2. Description of the Prior Art

In the field of magnetic disk apparatus used as, for example, one type of external storage devices for general-purpose electronic computers, there has recently been a demand for increases in storage capacity and operating speed. To meet this demand, a magnetic disk apparatus has been developed of the type which is provided with a multiplicity of magnetic disks serving as a storage medium and a multiplicity of heads for effecting recording and reproduction of information on and from the respective magnetic disks. One example of this type of magnetic disk apparatus is disclosed in U.S. Pat. No. 4,714,972.

In such a magnetic disk apparatus as is provided with a multiplicity of magnetic disks, in order to facilitate production and assembly of individual parts, it is common practice to employ head supporting structures all of which have the same structures. The head supporting structures are for connecting heads to an actuator for positioning the respective heads at desired positions on the corresponding disks, and, each constituted by a head arm, a leaf spring and a core slider for floating the head from the corresponding magnetic disk.

In such a situation, a servo control system is proposed as one example of a control system for controlling seek operation, that is, the operation of positioning a plurality of heads on corresponding magnetic disks by means of an actuator. In the known servo control system, one disk selected from a plurality of the magnetic disks is used as a servo disk, while one head selected from a plurality of the heads is used as a servo head. Servo information is recorded in advance on the servo disk. The servo information is read from the servo disk by the servo head and fed back for use in control of the actuator, whereby positioning of the data heads on the corresponding magnetic disks is controlled.

However, the above-described conventional type of magnetic disk apparatus involves a problem that, since the servo head and the data head for effecting normal recording and reproduction of information are respectively secured to the actuator by head supporting structures having the same structures, all the head supporting structures have the same proper oscillation. As a result, when high-speed seek operations are repeated, each data head vibrates and the vibration is inevitably transmitted to the servo head due to the resonance phenomenon of the head supporting structures. This leads to a fall in the positioning accuracy of each head during seek operation.

The above-described problem is serious when the speed of seek operation is to be increased to shorten the access time in order to achieve an even higher operating speed of the magnetic disk apparatus.

SUMMARY OF THE INVENTION

It is, therefore, an object of the present invention to provide a magnetic disk apparatus in which it is possible to improve the positioning accuracy of each head with respect to a desired position on a corresponding magnetic disk.

It is another object of the present invention to provide a magnetic disk apparatus in which it is possible to realize a speed-up of seek operation without deteriorating the positioning accuracy of each head with respect to a desired position on a corresponding magnetic disk.

In accordance with the present invention, there is provided a magnetic disk apparatus which comprises a disk assembly including a servo disk on which servo information is recorded in advance and at least one data disk for recording and reproduction of information; a servo head so disposed relative to the servo disk as to read out the servo information; a data head so disposed relative to the data disk as to effect recording and reproduction of information; an actuator for positioning the data head and the servo head at desired positions on the corresponding disks on the basis of the servo information; a servo-head supporting structure for supporting the servo head and a data-head supporting structure for supporting the data head, the servo-head and data-head supporting structures being arranged to connect the servo head and the data head to the actuator, respectively. The servo-head supporting structure and the data-head supporting structure have different proper oscillations.

As described above, in the magnetic disk apparatus according to the present invention, the servo head supporting structure and the data head supporting structure have different proper oscillations. Accordingly, when these head supporting structures are being actuated by the actuator for the purpose of a seek operation, neither of them undergoes resonance. Thus, it is possible to eliminate the problem that, due to the fact that the vibration of the data head is transmitted to the servo head through the actuator, the servo information read out by the servo head becomes unstable and, therefore, the operation of the actuator controlled on the basis of the servo information thus read becomes unstable. Accordingly, the accuracy of positioning of the head at any position on the corresponding magnetic disk can be enhanced.

In addition, since the head supporting structures are free from resonance, it is possible to achieve a speed-up of seek operation without lowering the accuracy of positioning the heads with respect to desired positions on the corresponding magnetic disks.

The above and other objects, features, and advantages of the present invention will become more apparent from the following description with reference to the accompanying drawings.

3

DESCRIPTION OF THE PREFERRED EMBODIMENTS

Figure 1:
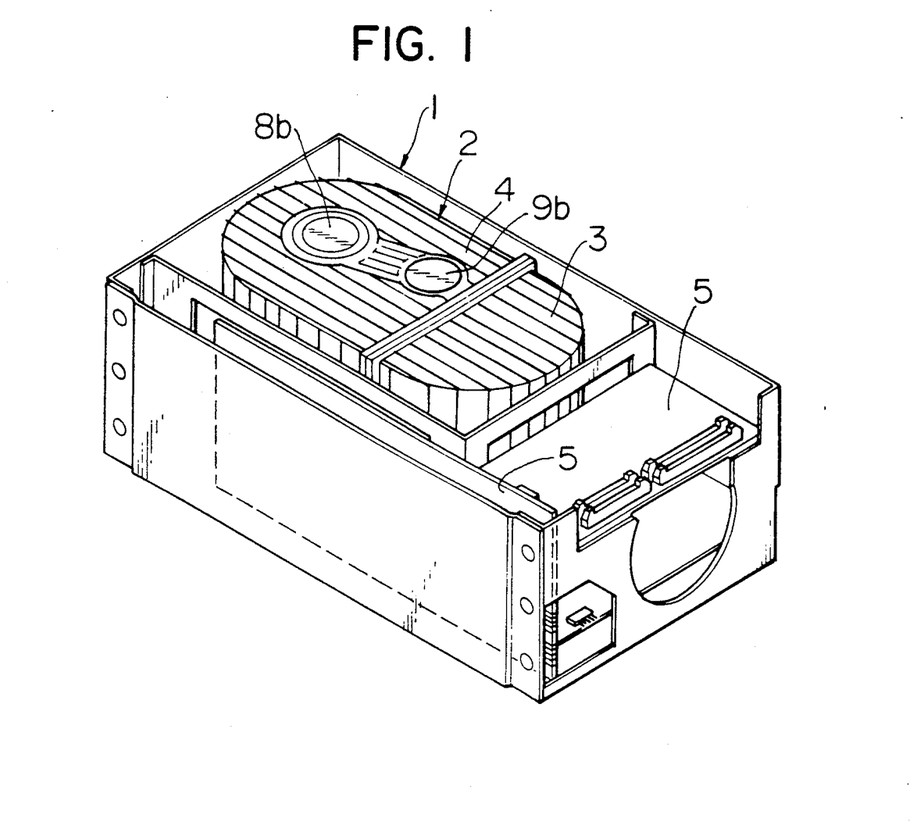
FIG. 1 is a perspective view of one preferred embodiment of a magnetic disk apparatus according to the present invention, with a lid member of a casing removed to show the interior of the apparatus.
Figure 2:
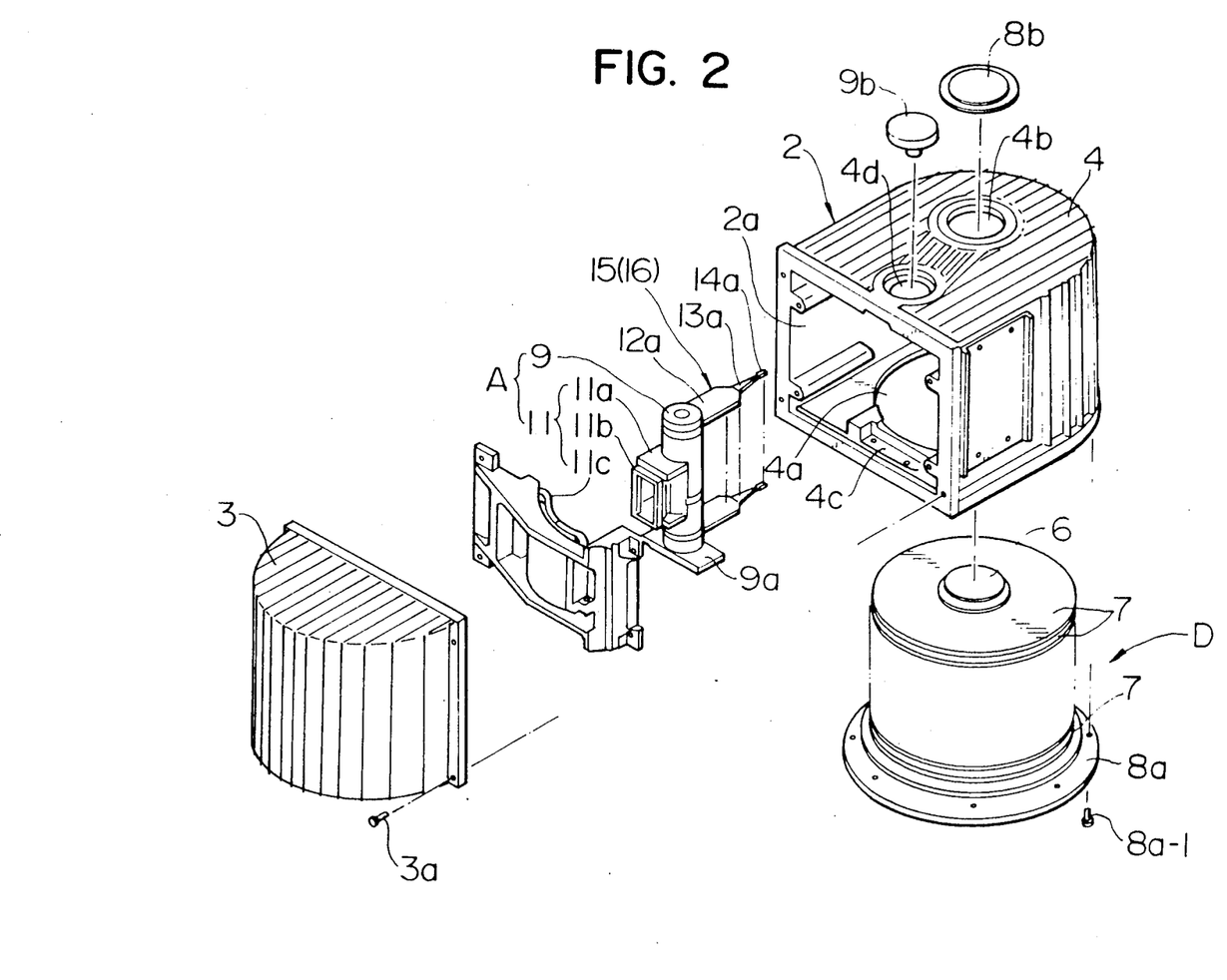
FIG. 2 is an exploded perspective view showing the essential elements accommodated in a housing of the apparatus shown in FIG. 1.
Figure 3:
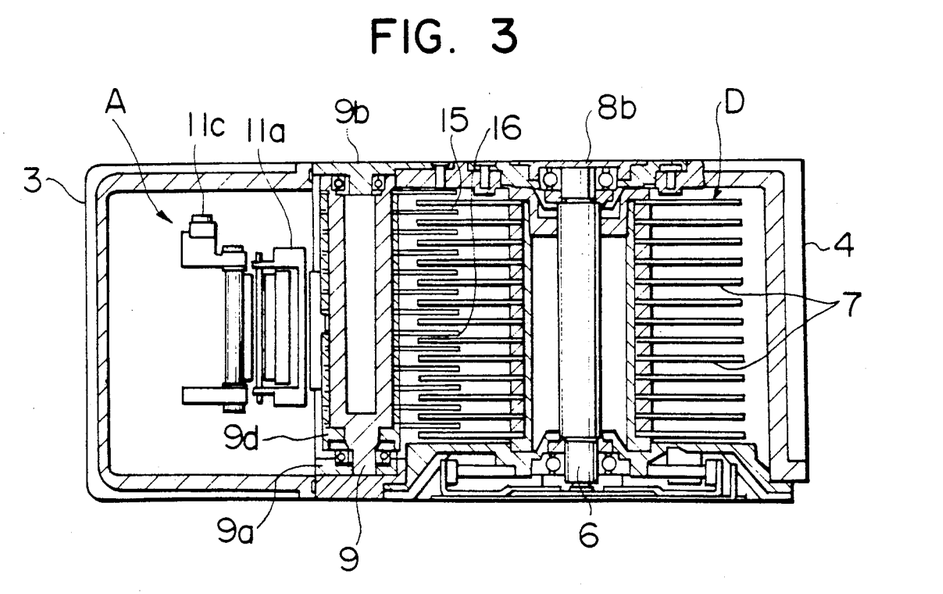
FIG. 3 is a cross-sectional view showing the elements shown in FIG. 2 in an assembled state.

With reference to FIGS. 1 to 3, a casing 1 accommodates a housing 2 composed of housing portions 3 and 4 and a plurality of circuit boards 5 which constitute an electrical circuit for controlling various operations of a magnetic disk apparatus. The housing portions 3 and 4 are detachably connected to each other by screws 3a to define a hermetically sealed space 2a in the interior of the casing 1. In this space 2a are disposed a disk assembly D, head supporting structures 15 and 16 for providing support for magnetic heads which will be described later, and an actuator A for actuating the head supporting structures 15 and 16.

As can be seen from FIG. 3, the disk assembly D includes a spindle 6 arranged to be rotated by a motor (not shown), a plurality of disks 7 which are mounted on the spindle 6 in such a manner that adjacent disks are disposed in parallel with each other and spaced apart at predetermined intervals along the axis of the spindle 6, and a circular base 8a for rotatably supporting the bottom end of the spindle 6. One disk which is located approximately in the middle of the pile of disks 7 is used as a servo disk, on which servo information is recorded in advance. The remaining disks 7 are used for recording and reproducing data. Since a similar disk assembly is disclosed in U.S. Pat. No. 4,714,972, any more detailed description of the structure of the disk assembly D will not be given.

Referring to FIG. 2, openings 4a and 4b are formed in the bottom wall and the top wall of the housing portion 4, respectively. The portion of the disk assembly D which excludes the base 8a is inserted through the opening 4a into the housing portion 4, and the base 8a is fixed to the bottom wall of the housing portion 4 by means of screws 8a-1. The top end of the spindle 6 is rotatably supported by a bearing 8b fitted into the opening 4b. The opening 4b is located on the longitudinal axis of the housing 2.

The actuator A has a hub 9. The bottom end and the top end of the hub 9 are respectively supported on a base 9a and a journal 9b by means of bearings 9-1 and 9-2 (refer to FIG. 5). The base 9a is fixed to a recess 4c formed in the portion of the bottom wall of the housing portion 4 which is adjacent to the abutting surface thereof at which the housing portion 4 abuts on the abutting surface of the housing portion 3. The journal 9b is fitted into a second opening 4d formed in the top wall of the housing portion 4. The axis of the hub 9 thus fixed is parallel to the axis of the spindle 6 of the disk assembly D (refer to FIG. 3). The opening 4d is offset from the longitudinal axis of the housing 2.

The hub 9 is provided with a voice-coil motor 11. The motor 11 is constituted by a bobbin 11a fixed to the hub 9 by means of a screw 10 (refer to FIG. 4), a voice coil 11b wound around the bobbin 11a as clearly shown in FIGS. 4 and 5, and a yoke 11c which surrounds the voice coil 11b and is fixed by means of screws (not shown) to the housing portion 4 in the vicinity of the abutting surface thereof which opposes and abuts against the housing portion 3 (refer to FIG. 2). The voice-coil motor 11 causes the hub 9 to rotate about the axis thereof by virtue of the electromagnetic force generated when the voice coil 11b is electrically energized.

Figure 4:
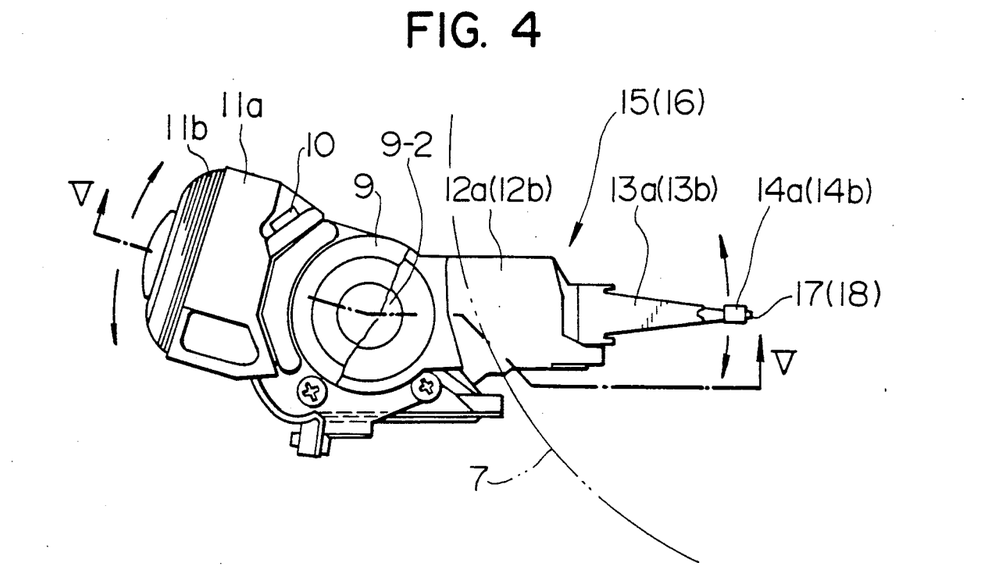
FIG. 4 is a plan view of the head supporting structures with a part cut away and an actuator for actuating the structures.
Figure 5:
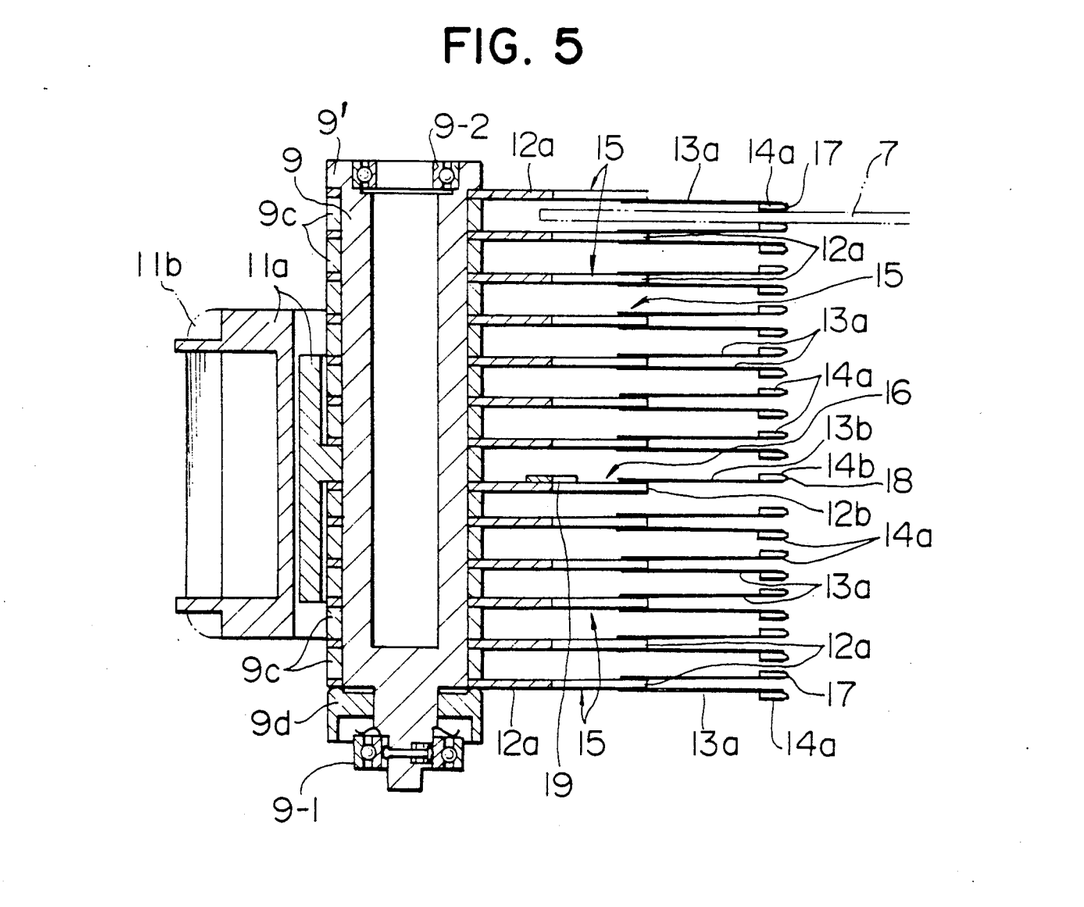
FIG. 5 is a partially sectional diagrammatic side elevational view taken along line V—V in FIG. 4.

Referring to FIGS. 4 and 5, the hub 9 comprises a hollow body. A plurality of head supporting structures 15 and a single head supporting structure 16 are mounted on the peripheral surface of the hub 9 at predetermined intervals along the axis thereof. The head supporting structures 15 and 16 extend from the hub 9 in the radial direction thereof. The head supporting structure 16 is disposed at a position corresponding to the aforesaid servo disk, that is, approximately at the middle of the pile of head supporting structures 15. The respective disks 7 are partially inserted between adjacent ones of the head supporting structures 15 and 16 (refer to FIG. 3).

With reference to FIGS. 4 to 7, the head supporting structures 15 and 16 will now be described in more detail.

As clearly shown in FIG. 5, all the head supporting structures 15 are each constituted by an arm 12a, two (the uppermost head supporting structure 15 has only one) leaf springs 13a each of which is fixed at one end to 12a, the projecting end of the arm 12a, and core sliders 14a which are fixed to the other ends of the respective leaf springs 13a. A data head 17 constituted by a magnetic core is fixed to the free end of each of the core sliders 14a. The uppermost head supporting structure 15 is constituted by a single arm 12a, one leaf spring 13a attached to the arm 12a, and one core slider 14a attached to the free end of the leaf spring 13a. A data head 17 is attached to this core slider 14a.

Similar to the uppermost head supporting structure 15, the head supporting structure 16 which cooperates with the servo disk 7 is constituted by a single arm 12b, a leaf spring 13b attached to the arm 12b, and a core slider 14b attached to the free end of the leaf spring 13b. A servo head 18 made of a material similar to the material of the data head 17 is attached to the free end of the core slider 14b.

Figure 6:
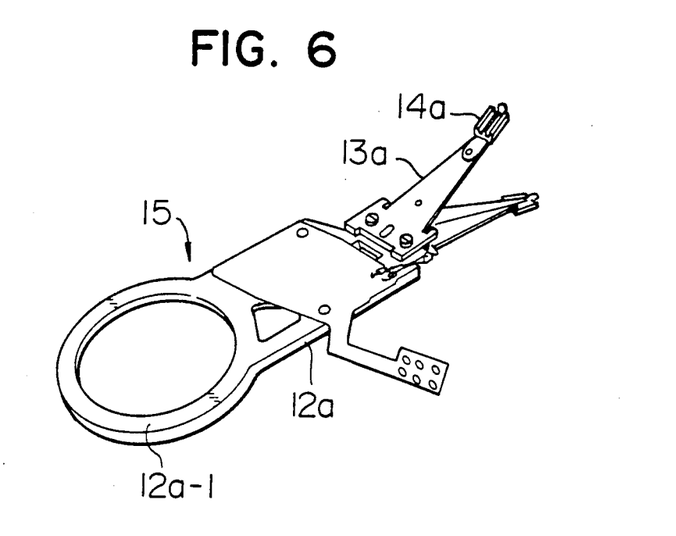
FIG. 6 is a perspective view of a head supporting structure for supporting a data head.
Figure 7:
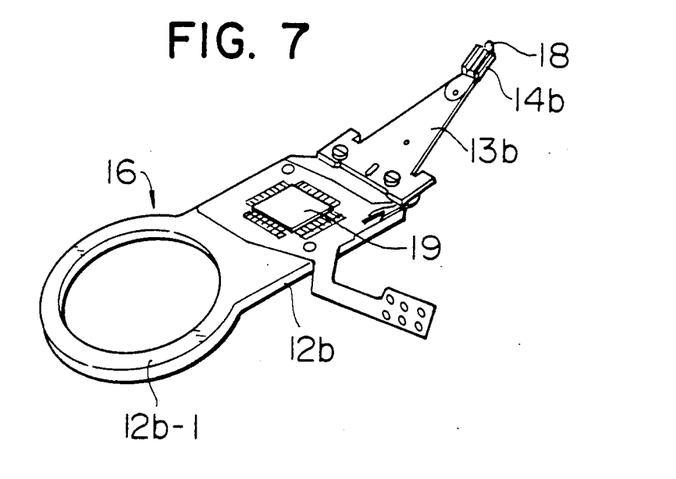
FIG. 7 is a perspective view of a head supporting structure for supporting a servo head.

As shown in FIGS. 6 and 7, the arms 12a and 12b of the respective head supporting structures 15 and 16 have ring-shaped portions 12a-1 and 12b-1 on the ends opposite to the leaf springs 13a and 13b. The ring-shaped portions 12a-1 and 12b-1 are received on the outer periphery of the hub 9. A spacer 9c having a predetermined axial dimension is inserted between each adjacent pair of the ring-shaped portions 12a-1 and 12a-2.

As shown in FIG. 5, a flange 9' which extends outwardly in the radial direction is formed at the to end of the hub 9. The bottom end of the hub 9 is provided with a clamp 9d immediately above the bearing 9-1. The clamp 9d cooperates with the flange 9' and the spacers 9c to secure all the head supporting structures 15 and 16 to the hub 9 at predetermined intervals along the axis thereof.

The core slider 14a of each head supporting structure 15 supports the data head 17 in close proximity to the corresponding data disk 7 so as to allow the data head 17 to effect normal recording and reproduction of information. The core slider 14b of the head supporting structure 16 supports the servo head 18 in close proximity to the corresponding servo disk 7 so as to allow the servo head 18 to read out the servo information recorded on the servo disk, so that the information thus read is fed back for use in the control of the voice-coil motor 11.

The arrangements of the electrical connections between the data heads 17 and an information processing device and between the servo head 18, a position controller and the voice-coil motor 11 are well known to those skilled in the art, and these arrangements do not constitute any part of the present invention. Description thereof is therefore omitted here.

An amplifier 19 for amplifying the servo information read out by the servo head 18 is mounted on the arm 12b of the head supporting structure 16. Accordingly, a position control signal based on the amplified information is supplied to the voice-coil motor to assure an increased accuracy of the positioning of the data heads 17 with respect to the corresponding data disks 7.

As clearly shown in FIG. 5 and as described previously, the head supporting structure 16 which supports the servo head 18 is attached to the hub 9 approximately at the middle of the length of the hub. Accordingly, even if the axis of the hub 9 is inclined in any direction away from its designed position due to a manufacturing error, it is possible to minimize the extent to which any reduction takes place in the accuracy of positioning the servo head 18 with respect to the servo disk 7 as a result of such an inclination.

Figure 8A:
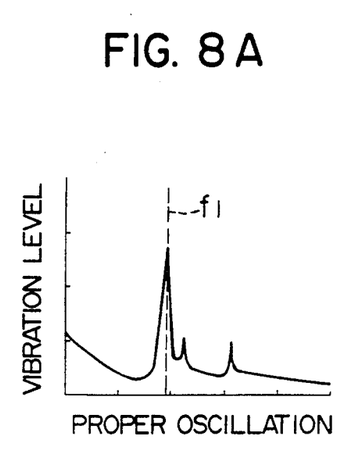
FIG. 8A is a graph showing the proper oscillation of the data head supporting structure shown in FIG. 6.
Figure 8B:
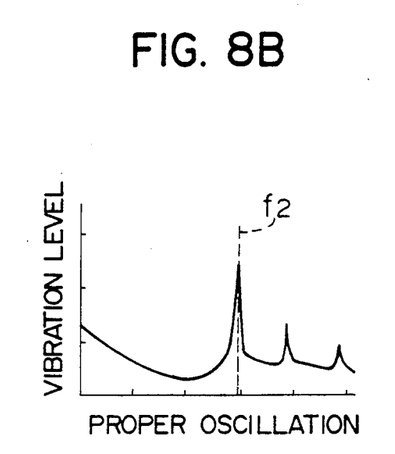
FIG. 8B is a graph showing the proper oscillation of the servo head supporting structure shown in FIG. 7.

Referring to FIGS. 6 and 7, the leaf spring 13b attached to the head supporting structure 16 which supports the servo head 18 is equal in length to, but greater in width than the leaf spring 13a attached to each of the head supporting structures 15 which support the data heads 17. Accordingly, each of the head supporting structures 15 and the head supporting structure 16 have different proper oscillations f1 and f2, respectively, as shown in FIGS. 8A and 8B.

The operation of the above-described embodiment will be described below.

When the magnetic disks 7 of the disk assembly D are not rotating, the core sliders 14a and 14b are at a standstill in contact with the surfaces of the magnetic disks 7 which are in a cooperative relationship with the respective core sliders 14a and 14b.

When the rotation of the magnetic disks 7 is started for recording or reproducing purpose, an air flow is formed. The air flow acts upon the core sliders 14a and 14b to produce lifting force. The core sliders 14a and 14b are therefore forced away from the surfaces of the corresponding magnetic disks 7 and floated to the positions at which the spring forces of the leaf springs 13a and 13b which support the core sliders 14a and 14b are balanced with the respective lifting forces. In such a balanced position, the data heads 17 and the servo head 18 oppose the corresponding surfaces of the magnetic disks 7 at positions spaced slightly apart from the disk surfaces.

In this state, when instructions for writing or reading of information are sent from a host information processing device to the magnetic disk apparatus, then these instructions are analyzed by a control section constituted by the circuit boards 5. On the basis of the result of the analysis, the control section specifies the required set of tracks from among a multiplicity of concentric tracks on the disks 7. Thereafter, the control section controls the amount, the direction, etc. of energization of the voice coil 11b of the voice-coil motor 11 on the basis of information such as servo information and position information obtained by the servo head 18 through the amplifier 19. Thus, the voice-coil motor 11 causes the hub 9 to rotate in the required direction and by the required angle. In consequence, the head supporting structures 15 and 16 are caused to rotate about the axis of the hub 9, so that the data heads 17 and the servo head 18 are caused to move across the corresponding magnetic disks 7 approximately in the radial direction thereof, as indicated by arrows in FIG. 4. Thus, the seek operation to position the heads 17 and 18 immediately above the desired set of tracks is completed. In addition, the control section executes final positioning of the data heads 17 with reference to various parameters, such as the rotational positions of the corresponding magnetic disks 7. Thus, a preparation of the required writing or reading of information onto or from the desired areas on the magnetic disks 7 serving as data disks is completed.

While the above-described seek operation is being repeated, the head supporting structures 15 and 16 which respectively support the data heads 17 and the servo head 18 vibrate due to their swinging motion. The vibration increases in proportion to the driving force of the voice-coil motor 11, that is, the speed of the seek operation. If all of the data-head supporting structures 15 and the servo-head supporting structure 16 had the same configurations and structures, as in the conventional arrangement, then, the proper oscillations of all the head supporting structures become equal, with the result that those structures will undergo resonance. More specifically, the vibration of the head supporting structures 15 which support the respective data heads 17 is transmitted through the hub 9 to the head supporting structure 16 supporting the servo head 18, thus amplifying the harmful vibration of the head supporting structure 16. Accordingly, the servo information read by the servo head 18 from the magnetic disk 7 serving as the servo disk becomes unstable. As a result, positioning of the data heads 17 on the corresponding data disks 7 is executed on the basis of the unstable information thus obtained, so that the positioning accuracy of the data heads 17 is reduced.

Figure 10:
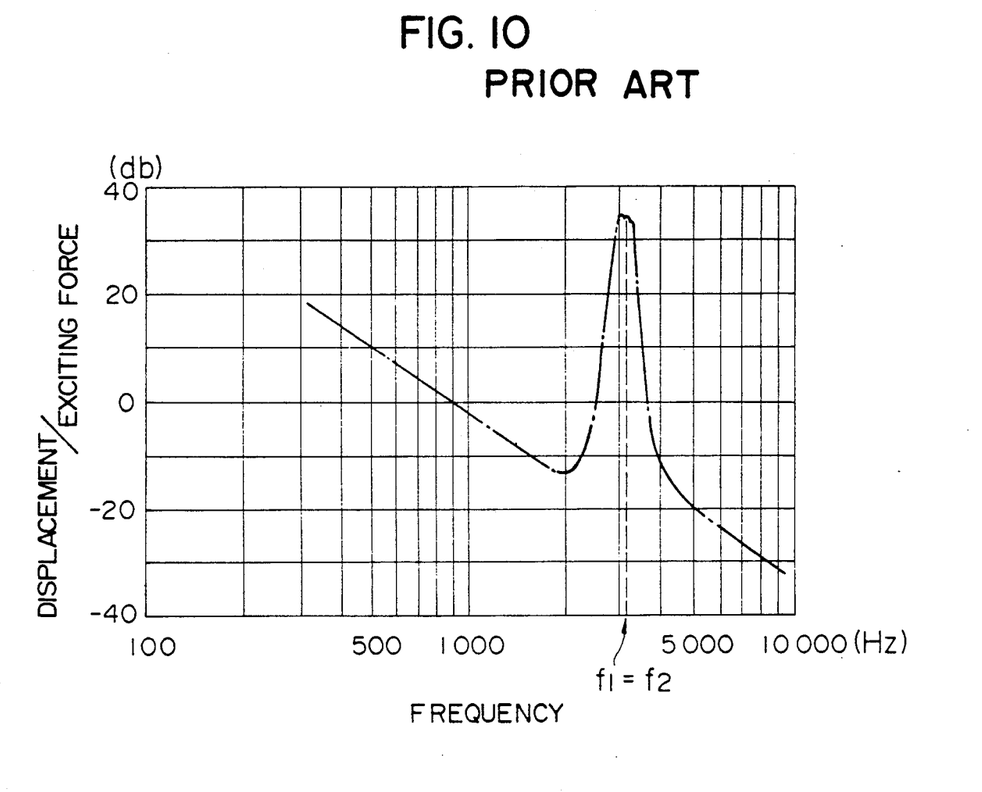
FIG. 10 is a graph showing the vibration characteristic of a conventional magnetic disk apparatus with all the head supporting structures thereof having the same proper oscillations.

FIG. 10 is a graph which illustrates the resonance characteristic of a conventional magnetic disk apparatus when in operation. The ratio of the displacement of the servo head 18 (obtained from servo information) to the amount of energization of the voice-coil motor 11, that is, the exciting force, is plotted along the vertical axis, while the frequencies of the leaf springs 13a and 13b are plotted along the horizontal axis. In the conventional magnetic disk apparatus tested, the leaf springs 13a and 13b of all the head supporting structures had proper oscillations which were equal (approximately 3 kHz), and the force of each of the leaf springs 13a and 13b which acted to press the core sliders 14a and 14b against the respective magnetic disks 7 was set to be as large as $1 \times 10^{-3}$. As can be seen from the graph in FIG. 10, resonance occurred at 3 kHz which was the same proper oscillation of the leaf springs 13a and 13b, so that control by the voice-coil motor 11 on the displacement of the data heads 17 and the servo head 18 was unstable to a great extent.

Figure 9:
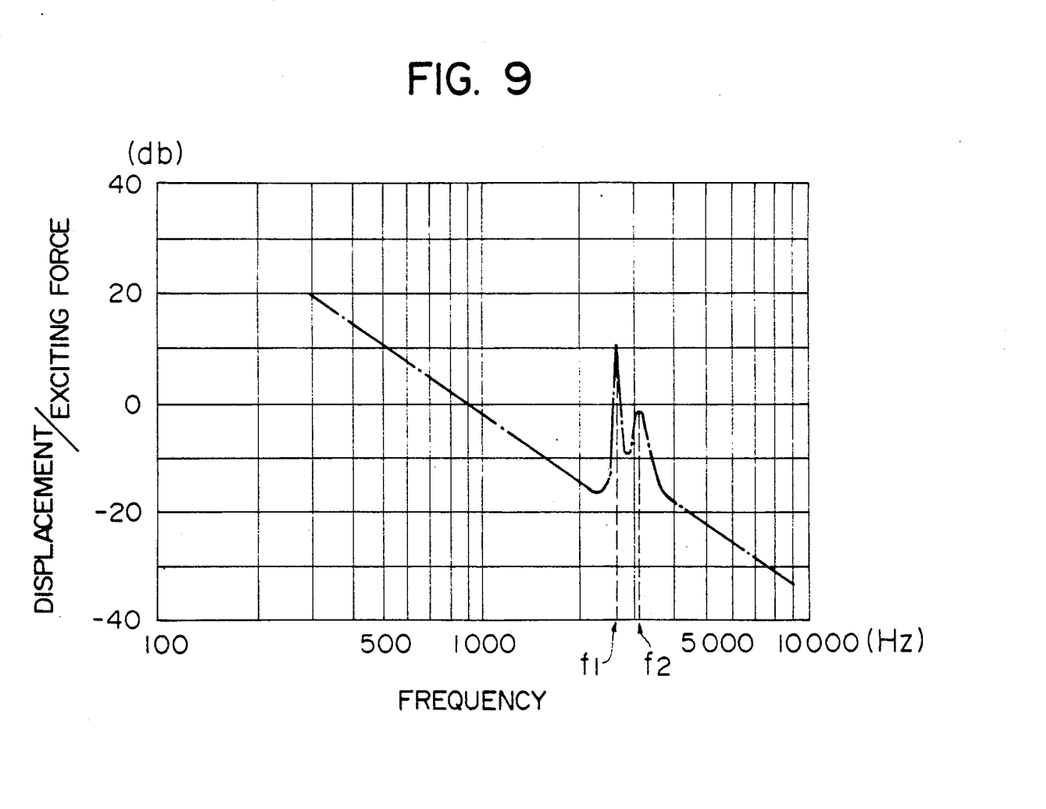
FIG. 9 is a graph showing the vibration characteristic of a magnetic disk apparatus which employs the head supporting structures shown in FIGS. 6 and 7.

In contrast, since the leaf springs 13a and 13b of the respective head supporting structures 15 and 16 of the above-described embodiment have different proper oscillations f1 and f2, as can be seen from FIG. 9, these leaf springs do not undergo resonance. Accordingly, it is possible to prevent the occurrence of any large fluctuation in the servo information read from the servo disk 7 by the servo head 18 and, therefore, improve the accuracy at which the data heads 17 are positioned on the corresponding data disks 7 on the basis of the servo information. This means that the exciting force of the voice-coil motor 11 can be increased to increase the speed of seek operation without any need to take account of the problem of the resonance of the head supporting structures 15 and 16, thereby enabling the access time to be shortened. In other words, it is possible to achieve seek operation at an even higher speed without deteriorating the accuracy of positioning each head with respect to the desired position on an associated magnetic disk 7.

In the above-described embodiment, in order to make the proper oscillation of each head supporting structure 15 differ from that of the head supporting structure 16, each of the leaf springs 13a and the leaf spring 13b are given different widths. However, for the same purpose, the thickness of the leaf spring 13a may be made different from that of the leaf spring 13b or, alternatively, the materials of the leaf springs 13a and 13b may be made different from each other (that is, the leaf spring 13a and 13b may be made from stainless steels of two kinds whose elastic modules differ from each other).

Figure 11A:
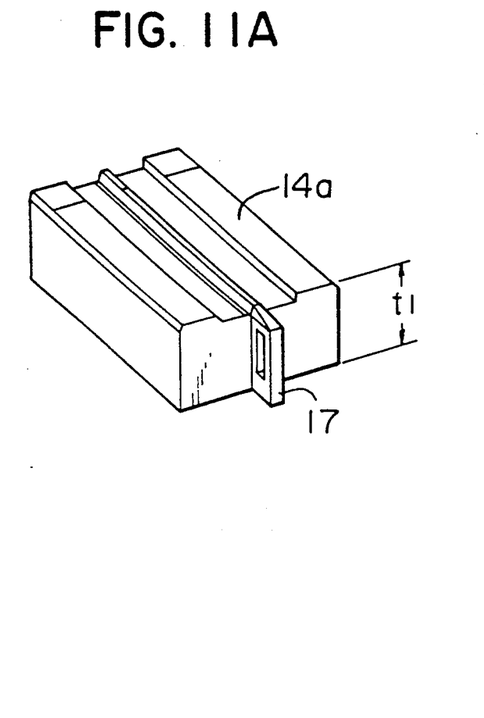
FIGS. 11A, 11B, 12A and 12B are perspective views showing modifications of the head supporting structures used in the present invention.
Figure 11B:
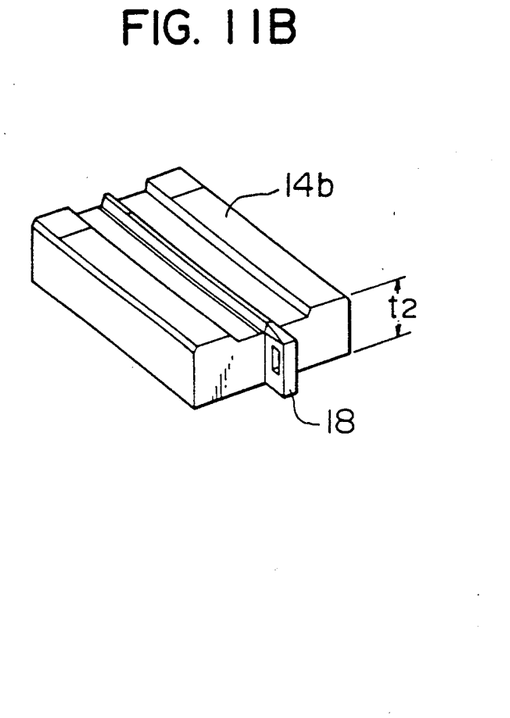

FIGS. 11A and 11B show a modification to the above-described embodiment which is applied to the arrangements of the head supporting structures 15 and 16. In this modified form, the thickness t1 of the core slider 14a on which a data head 17 is mounted is greater than the thickness t2 of the core slider 14b on which the servo head 18 is mounted. In the other respects, the head supporting structure 15 is substantially identical to the head supporting structure 16. Since the head supporting structures 15 and 16 likewise have different proper oscillations f1 and f2 because of the difference between the thickness t1 and the thickness t2, this modified form can also provide effects and advantages similar to those of the embodiment described above.

Figure 12A:
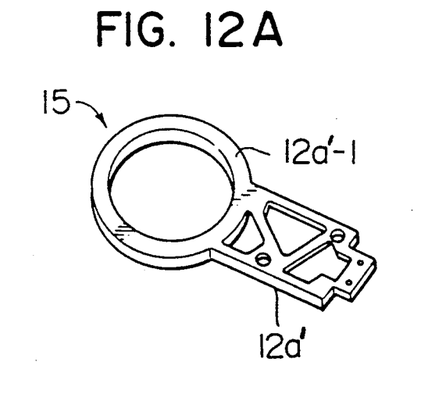
Figure 12B:
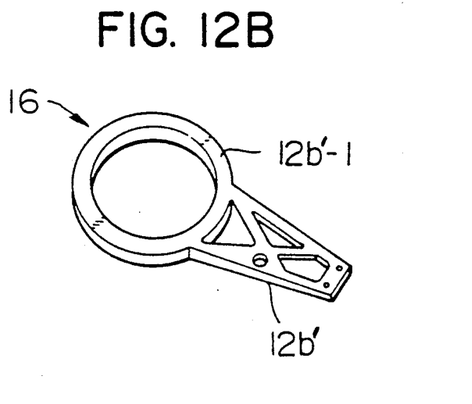

FIGS. 12A and 12B show a second modification to the arrangements of the head supporting structures 15 and 16. In this modified form, the arms 12a' and 12b' are so formed as to have mutually different configurations.

More specifically, the arms 12a' and 12b' have substantially the same lengths and also have substantially the same widths measured at their ends connected to the ring-shaped portions 12a'-1 and 12b'-1, as clearly seen in FIGS. 12A and 12B. However, the arm 12a' is generally rectangular, while the arm 12b' is of a generally trapezoidal shape with its shortest side disposed remote from the ring-shaped portion 12b'-1. In other words, the arm 12a' has two substantially parallel major sides extending from the ring-shaped portion 12a'-1, while the arm 12b' has two converging major sides extending from the ring-shaped portion 12b'-1. Since the head supporting structures 15 and 16 likewise have different proper oscillations, f1 and f2 because of the difference in configuration between the arms 12a' and 12b', this modified example can also provide effects and advantages similar to those of the embodiment described above.

In the above-described embodiment and its modifications, in order to impart different proper oscillations f1 and f2 to the head supporting structures 15 and 16, these head supporting structures are designed to have different configurations. However, both of the head supporting structures 15 and 16 may be so formed as to have the same configurations but may be made of different materials, such as stainless steels of different kinds having different elastic modules.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. A magnetic disk apparatus comprising:
a disk assembly including a servo disk on which servo information is recorded in advance and at least one data disk for recording and reproduction of information;
a servo head so disposed relative to said servo disk as to read out said servo information;
a data head so disposed relative to said data disk as to effect recording and reproduction of information;
an actuator for positioning said data head and said servo head at desired positions on said data disk and servo disk, respectively, on the basis of said servo information;
a servo-head supporting structure for supporting said servo head;
a data-head supporting structure for supporting said data head;
each of said servo-head supporting structure and said data-head supporting structure having an arm fixed at one end to said actuator, a leaf spring fixed at one end to the other end of said arm, and a core slider fixed to the other end of said leaf spring and supporting one of said servo head and said data head; and
said leaf springs of said servo-head supporting structure and said data-head supporting structure having different widths to provide said servo-head and data-head supporting structures with different proper oscillations.

2. A magnetic disk apparatus comprising:
a disk assembly including a servo disk on which servo information is recorded in advance and at least one data disk for recording and reproduction of information;
a servo head so disposed relative to said servo disk as to read out said servo information;
a data head so disposed relative to said data disk as to effect recording and reproduction of information;
an actuator for positioning said data head and said servo head at desired positions on said data disk and servo disk, respectively, on the basis of said servo information;
a servo-head supporting structure for supporting said servo head;
a data-head supporting structure for supporting said data head;

each of said servo-head supporting structure and said data-head supporting structure having an arm fixed at one end to said actuator, a leaf spring fixed at one end to the other end of said arm, and a core slider fixed to the other end of said leaf spring and supporting one of said servo head and said data head; and said leaf springs of said servo-head supporting structure and said data-head supporting structure being made of different kinds of materials to provide said servo-head and data-head supporting structures with different proper oscillations.

3. A magnetic disk apparatus comprising:

a disk assembly including a servo disk on which servo information is recorded in advance and at least one data disk for recording and reproduction of information;

a servo head so disposed relative to said servo disk as to read out said servo information;

a data head so disposed relative to said data disk as to effect recording and reproduction of information;

an actuator for positioning said data head and said servo head at desired positions on said data disk and servo disk, respectively, on the basis of said servo information;

a servo-head supporting structure for supporting said servo head;

a data-head supporting structure for supporting said data head;

each of said servo-head supporting structure and said data-head supporting structure having an arm fixed at one end to said actuator, a leaf spring fixed at one end to the other end of said arm, and a core slider fixed to the other end of said leaf spring and supporting one of said servo head and said data head; and said core sliders of said servo-head supporting structure and said data-head supporting structure having different masses to provide said servo-head and data-head supporting structures with different proper oscillations.

4. A magnetic disk apparatus comprising:

a disk assembly including a servo disk on which servo information is recorded in advance and at least one data disk for recording and reproduction of information;

a servo head so disposed relative to said servo disk as to read out said servo information;

a data head so disposed relative to said data disk as to effect recording and reproduction of information;

an actuator for positioning said data head and said servo head at desired positions on said data disk and servo disk, respectively, on the basis of said servo information;

a servo-head supporting structure for supporting said servo head;

a data-head supporting structure for supporting said data head;

each of said servo-head supporting structure and said data-head supporting structure having an arm fixed at one end to said actuator, a leaf spring fixed at one end to the other end of said arm, and a core slider fixed to the other end of said leaf spring and supporting one of said servo head and said data head; and said arms of said servo-head supporting structure and said data-head supporting structure having substantially equal widths measured at said one ends, one of the arms of said servo-head and data-head supporting structures being generally rectangular while the widths of the other arm is gradually decreased toward the other end to provide said servo-head and data-head supporting structures with different proper oscillations.

5. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axes thereof;

a servo head so disposed relative to said servo disk as to read out said servo information;

a plurality of data heads so disposed relative to said respective data disk as to effect recording and reproduction of information;

an actuator for positioning said data heads and said servo head at desired positions on said corresponding disks on the basis of said servo information, said actuator including a second rotary member and a motor for driving said second rotary member;

a servo-head supporting structure for supporting said servo head;

data-head supporting structure for supporting said respective data heads;

said servo-head and data-head supporting structures being arranged to connect said servo head and said data heads to said secondary rotating member, respectively;

said servo-head supporting structure being located between at least two data heads and substantially in the middle of the axis of said second rotary member, and said servo disk being located in said disk assembly at a position corresponding to the axial position of said servo head supporting structure and between at least two of said data disks; and means for providing said servo-head supporting structure and said data-head supporting structures with different proper oscillations by the operating driving force and speed of the actuator so that the different proper oscillations are sufficiently far apart in frequency to prevent resonance between them by traveling through said single hub.

6. A magnetic disk apparatus according to claim 5, wherein said servo-head supporting structure and said data-head supporting structures are each fixed at one end to said second rotary member, while said servo head and said data heads are respectively mounted on the other ends of said servo-head supporting structure and said data-head supporting structures.

7. A magnetic disk apparatus according to claim 5, wherein said servo-head supporting structure and each of said data head supporting structures have different configurations.

8. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axis of said first rotary member;

a servo head so disposed relative to said servo disk as to read out said servo information;

a plurality of data heads so disposed relative to the respective data disks as to effect recording and reproduction of information;

an actuator for positioning said data heads and said servo head at desired positions on associated disks on the basis of said servo information, said actuator including a second rotary member and a motor for driving said second rotary member;

a servo-head supporting structure for supporting said servo head;

a data-head supporting structure for supporting respective data heads;

said servo-head and data-head supporting structures being arranged to connect said servo head and said data heads to said second rotary member, respectively;

said servo-head supporting structure being located substantially in the middle of the axis of said second rotary member, and said servo disk being located in said disc assembly at a position corresponding to the axial position of said servo head supporting structure; and said servo-head supporting structure and each of said data-head supporting structures being made of different kinds of materials so as to have different proper oscillations.

9. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axis of said first rotary member;

a servo head so disposed relative to said servo disk as to read out said servo information;

a plurality of data heads so disposed relative to the respective data disks as to effect recording and reproduction of information;

an actuator for positioning said data heads and said servo head at desired positions on associated disks on the basis of said servo information, said actuator including a second rotary member and a motor for driving said second rotary member;

a servo-head supporting structure for supporting said servo head;

a data-head supporting structure for supporting respective data heads;

said servo-head and data-head supporting structures being arranged to connect said servo head and said data heads to said second rotary member, respectively;

said servo-head supporting structure being located substantially in the middle of the axis of said second rotary member, and said servo disk being located in said disc assembly at a position corresponding to the axial position of said servo head supporting structure;

said servo-head supporting structure and each of said data-head supporting structures being each fixed at one end to said secondary rotary member and including a core slider at the other end, said servo head and said data heads being mounted on the core sliders of said servo-head supporting structure and said data-head supporting structures, respectively; and said core sliders of said servo-head supporting structure and each of said data-head supporting structures having different masses to provide said servo-head and data-head supporting structures with different proper oscillations.

10. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axis of said first rotary member;

a servo head so disposed relative to said servo disk as to read out said servo information;

a plurality of data heads so disposed relative to the respective data disks as to effect recording and reproduction of information;

an actuator for positioning said data heads and said servo head at desired positions on associated disks on the basis of said servo information, said actuator including a second rotary member and a motor for driving said second rotary member;

a servo-head supporting structure for supporting said servo head;

a data-head supporting structure for supporting respective data heads;

said servo-head and data-head supporting structures being arranged to connect said servo head and said data heads to said second rotary member, respectively;

said servo-head supporting structure being located substantially in the middle of the axis of said second rotary member, and said servo disk being located in said disc assembly at a position corresponding to the axial position of said servo head supporting structure;

each of said servo-head supporting structure and said data-head supporting structures having an arm fixed at one end to said secondary rotary member, a leaf spring fixed at one end to the other end of said arm, and a core slider fixed to the other end of said leaf spring and supporting one of said servo head and said data heads;

said arms of said servo-head supporting structure and each of said data-head supporting structures having substantially equal widths measured at said one ends, one of the arms of said servo-head supporting structure and of each of said data-head supporting structures being generally rectangular while the width of the other arm is gradually decreased toward the other end to provide said servo-head supporting structure and each data-head supporting structure with different proper oscillations.

11. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axis of said first rotary member;

a servo head so disposed relative to said servo disk as to read out said servo information;

a plurality of data heads so disposed relative to the respective data disks as to effect recording and reproduction of information;

an actuator for positioning said data heads and said servo head at desired positions on associated disks on the basis of said servo information, said actuator including a second rotary member and a motor for driving said second rotary member;

a servo-head supporting structure for supporting said servo head;

data-head supporting structure for supporting respective data heads;

said servo-head and data-head supporting structures being arranged to connect said servo head and said data heads to said second rotary member, respectively;

said servo-head supporting structure being located substantially in the middle of the axis of said second rotary member, and said servo disk being located in said disc assembly at a position corresponding to the axial position of said servo head supporting structure;

each of said servo-head supporting structure and said data-head supporting structures having an arm fixed at one end to said second rotary member, a leaf spring fixed at one end to the other end of said arm, and a core slider fixed to the other end of said leaf spring and supporting one of said servo head and said data heads;

said leaf springs of said servo-head supporting structure and each of said data-head supporting structures having different widths to provide said servo-head and data-head supporting structures with different proper oscillations.

12. A magnetic disk apparatus comprising:

a disk assembly including a single servo disk on which servo information is recorded in advance and at least one data disk for recording and reproduction of information;

a servo head so disposed relative to said servo disk as to read out said servo information;

a data head so disposed relative to the said data disk as to effect recording and reproduction of information;

an actuator for positioning said data head and said servo head at desired positions on said data disk and servo disk, respectively, on the basis of said servo information;

a servo-head supporting structure for supporting said servo head;

a data-head supporting structure for supporting said data head;

each of said servo-head supporting structure and said data-head supporting structures having an arm fixed at one end to said actuator, a leaf spring fixed at one end to the other end of said arm, and a core slider fixed to the other end of said leaf spring and supporting one of said servo head and said data head; and said leaf springs of said servo-head supporting structure and said data-head supporting structure having different thicknesses in at least a part of lengths of the leaf springs to provide said servo-head and data-head supporting structures with different proper oscillations.

13. A magnetic disk apparatus comprising:

a disk assembly including a single servo disk on which servo information is recorded in advance, a plurality of data disks for recording and reproduction of information, and a first rotary member which supports said disks in an axially spaced relationship and which is driven to cause said disks to rotate about the axis of said first rotary member;

a servo head so disposed relative to said servo disk as to read out said servo information;

a plurality of data heads so disposed relative to the respective data disks as to effect recording and reproduction of information;

an actuator for positioning said data heads and said servo head at desired positions on associated disks on the basis of said servo information, said actuator including a second rotary member and a motor for driving said second rotary member;

a servo-head supporting structure for supporting said servo head;

data-head supporting structure for supporting respective data heads;

said servo-head and data-head supporting structures being arranged to connect said servo head and said data heads to said second rotary member, respectively;

said servo-head supporting structure being located substantially in the middle of the axis of said second rotary member, and said servo disk being located in said disc assembly at a position corresponding to the axial position of said servo head supporting structure;

each of said servo-head supporting structure and said data-head supporting structures having an arm fixed at one end to said second rotary member, a leaf spring fixed at one end to the other end of said arm, and a core slider fixed to the other end of said leaf spring and supporting one of said servo head and said data heads; and at least a part of the leaf spring of said servo-head supporting structure having a thickness different from that of a corresponding part of each of the leaf springs of said data-head supporting structures to provide said servo-head and data-head supporting structures with different proper oscillations.

* * * * *